(12) United States Patent
Park et al.

(10) Patent No.: US 12,346,448 B2
(45) Date of Patent: Jul. 1, 2025

(54) STORAGE CONTROLLER, STORAGE SYSTEM, AND METHOD OF OPERATING STORAGE DEVICE

(71) Applicant: Samsung Electronics Co., Ltd., Suwon-si (KR)

(72) Inventors: Moonchan Park, Suwon-si (KR); Jisoo Kim, Seongnam-si (KR); Younsung Chu, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 300 days.

(21) Appl. No.: 18/056,325

(22) Filed: Nov. 17, 2022

(65) Prior Publication Data

US 2023/0222219 A1 Jul. 13, 2023

(30) Foreign Application Priority Data

Jan. 7, 2022 (KR) ........................ 10-2022-0002955

(51) Int. Cl.
*G06F 21/57* (2013.01)
*G06F 21/12* (2013.01)
(Continued)

(52) U.S. Cl.
CPC ............ *G06F 21/572* (2013.01); *G06F 21/44* (2013.01); *G06F 21/602* (2013.01); *G06F 2221/033* (2013.01)

(58) Field of Classification Search
CPC ...... G06F 21/572; G06F 21/44; G06F 21/602; G06F 21/12; G06F 21/51; G06F 21/64;
(Continued)

(56) References Cited

U.S. PATENT DOCUMENTS 7,243,240 B2 7/2007 Wang
10,114,941 B2 10/2018 Pedersen
(Continued)

FOREIGN PATENT DOCUMENTS

CN 110532735 A 12/2019
KR 10-2208141 B1 1/2021

OTHER PUBLICATIONS

Extended European Search Report issued May 31, 2023 in European Patent Application No. 22213070.0.

*Primary Examiner* — Vu V Tran
(74) *Attorney, Agent, or Firm* — Harness, Dickey & Pierce, P.L.C.

(57) ABSTRACT

A storage system includes: a host configured to receive a software image and a first signature for the software image, the first signature being generated based on a first secret key, and generate, based on a second secret key, a second signature for the software image; and a storage device configured to receive, from the host, the software image, the first signature, the second signature, and a second public key related to the second secret key and execute the software image, based on a first verification and a second verification the first verification being performed on the first signature on the basis of a first public key related to the first secret key, and the second verification being performed on the second signature on the basis of the second public key.

18 Claims, 10 Drawing Sheets

(51) Int. Cl.
  *G06F 21/44* (2013.01)
  *G06F 21/50* (2013.01)
  *G06F 21/51* (2013.01)
  *G06F 21/60* (2013.01)
  *G06F 21/62* (2013.01)
  *G06F 21/64* (2013.01)
  *G06F 21/78* (2013.01)
  *H04L 9/08* (2006.01)
  *H04L 9/40* (2022.01)

(58) Field of Classification Search
  CPC .......... G06F 21/78; G06F 21/50; G06F 21/62; G06F 2221/033; H04L 63/123; H04L 9/0825
  See application file for complete search history.

(56) References Cited

U.S. PATENT DOCUMENTS

| | | |
|---|---|---|
| 10,659,234 B2 | 5/2020 | Varadhan et al. |
| 10,872,155 B2 | 12/2020 | Oh et al. |
| 2012/0210115 A1 | 8/2012 | Park et al. |
| 2013/0185564 A1 | 7/2013 | Jaber et al. |
| 2017/0230185 A1* | 8/2017 | Varadhan .................. H04L 9/14 |
| 2017/0286665 A1* | 10/2017 | Miranda ............. H04L 63/0823 |
| 2017/0302457 A1* | 10/2017 | Nakamoto ................ H04L 9/30 |
| 2019/0305949 A1 | 10/2019 | Hamel et al. |
| 2021/0200874 A1 | 7/2021 | Markey et al. |
| 2022/0209946 A1* | 6/2022 | Simon .................... H04W 12/04 |
| 2023/0359741 A1* | 11/2023 | Zhang .................. H04L 9/3247 |

* cited by examiner

FIG. 8

| STATE | FW SIGNATURE | | AUTHORITY | |
|---|---|---|---|---|
| | SIG A | SIG B | ExDv | HOST |
| State 1 | ○ | × | ○ | × |
| State 2 | ○ | × | × | ○ |
| State 3 | ○ | ○ | ○ | × |
| State 4 | ○ | ○ | × | ○ |

STATE VALUE

AUTHENTICATION STATE TABLE

FIG. 9
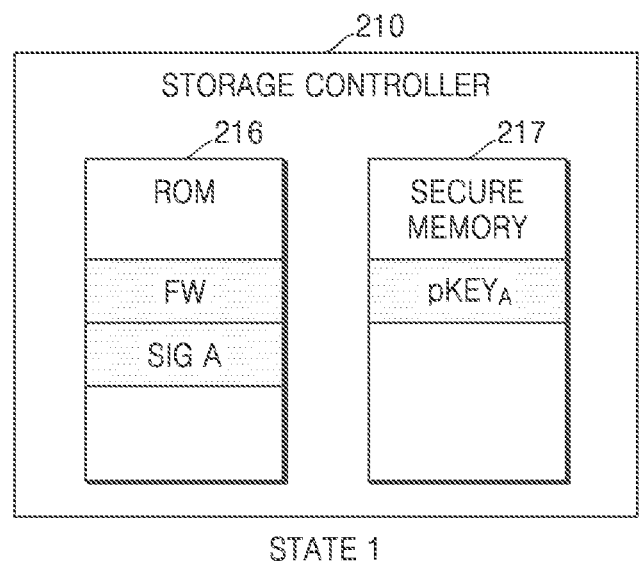
STATE 1
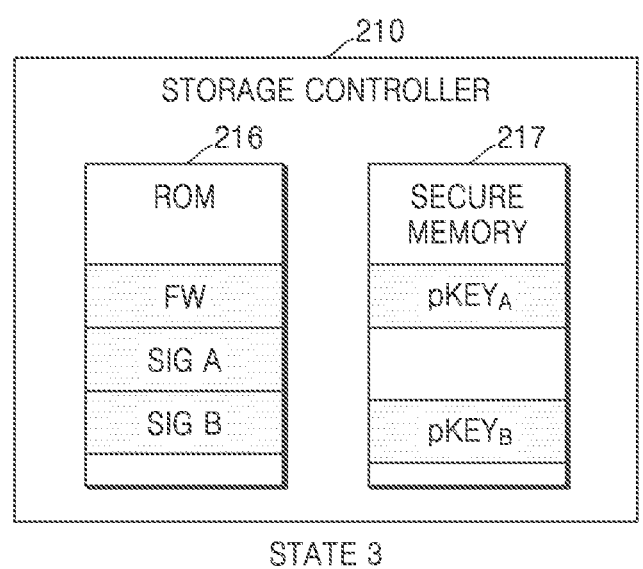
STATE 3

STORAGE CONTROLLER, STORAGE SYSTEM, AND METHOD OF OPERATING STORAGE DEVICE

CROSS-REFERENCE TO RELATED APPLICATION

This application claims priority under 35 U.S.C. § 119 to Korean Patent Application No. 10-2022-0002955, filed on Jan. 7, 2022, in the Korean Intellectual Property Office, the disclosure of which is incorporated by reference herein in its entirety.

BACKGROUND

The inventive concepts relate to a storage device, and more particularly, to a storage device storing a software image and an electronic signature for the software image.

Firmware may refer to a program for controlling hardware. Firmware may be provisioned into a storage space in hardware when the hardware is manufactured. Attacks against systems (including firmware and hardware) may be attempted in various manners. One such manner is to cause systems to perform operations intended by the attackers by changing at least a portion of firmware of the systems.

SUMMARY

The inventive concepts provide a storage controller, which authenticates dual-signed firmware generated by a firmware distributor and a host, and a method of operating a storage device.

According to an example embodiment of the inventive concepts, there is provided a storage system including: a host configured to receive a software image and a first signature for the software image, the first signature being generated based on a first secret key, and generate, based on a second secret key, a second signature for the software image; and a storage device configured to receive, from the host, the software image, the first signature, the second signature, and a second public key related to the second secret key and execute the software image, based on a first verification and a second verification, the first verification being performed on the first signature on the basis of a first public key related to the first secret key, and the second verification being performed on the second signature on the basis of the second public key.

According to another example embodiment of the inventive concepts, there is provided a storage controller including: a processor; a non-volatile memory storing a software image, which is executed by the processor, and a first signature for the software image; a secure memory storing a first public key used to verify the first signature; and a host interface configured to receive, from a host, a second public key, and a second signature for the software image, wherein the processor is configured to authenticate the second public key, authenticate the second signature based on the second public key, store the second signature in the non-volatile memory, and store the second public key in the secure memory.

According to yet another example embodiment of the inventive concepts, there is provided a method of operating a storage device, the method including: receiving, by the storage device from a host, a software image, a first signature for the software image, a second signature for the software image, and a second public key; performing, by the storage device, first verification on the first signature based on a first public key; performing, by the storage device, second verification on the second signature based on the second public key; and storing, by the storage device, the software image, the first signature, and the second signature based on the first verification and the second verification.

BRIEF DESCRIPTION OF THE DRAWINGS

Example embodiments of the inventive concepts will be more clearly understood from the following detailed description taken in conjunction with the accompanying drawings in which:

FIG. 8 is a diagram illustrating an authentication state table and state transition, according to some example embodiments of the inventive concepts;

FIG. 9 is a diagram illustrating data stored in ROM and a secure memory for each authentication state, according to some example embodiments of the inventive concepts;

DETAILED DESCRIPTION OF THE EXAMPLE EMBODIMENTS

Hereinafter, various example embodiments of the inventive concepts will be described with reference to the accompanying drawings.

Figure 1:
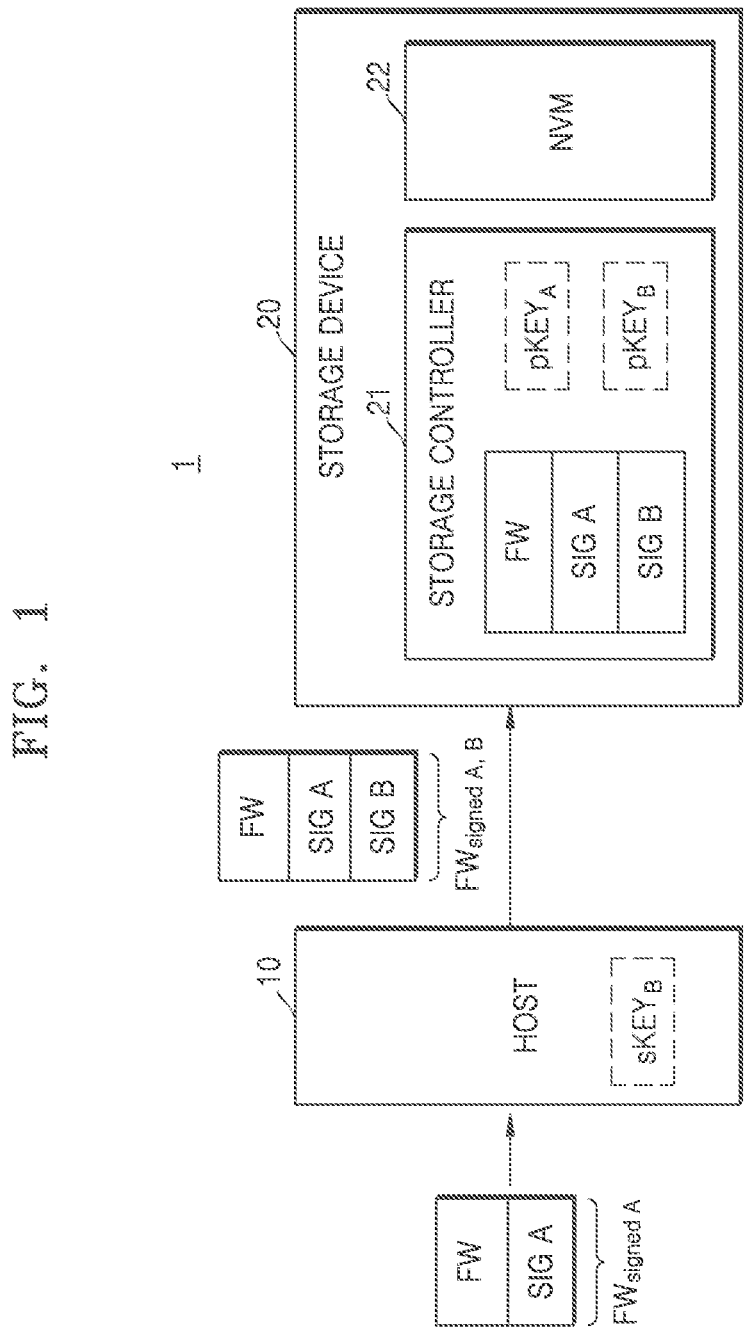
FIG. 1 is a block diagram illustrating a storage system according to some example embodiments of the inventive concepts.

FIG. 1 is a block diagram illustrating a storage system 1 according to some example embodiments of the inventive concepts. In some example embodiments, the storage system 1 may include, as a non-limiting example, a stationary computing system, such as a server, a desktop computer, or a kiosk, or a subsystem thereof. In some example embodiments, the storage system 1 may include, as a non-limiting example, a portable computing system, such as a mobile phone, a wearable device, or a laptop computer, or a subsystem thereof. In some example embodiments, the storage system 1 may include, as a non-limiting example, a subsystem included in any system, such as a household appliance, an industrial machine, or a transport means, which is different from a stand-alone computing system.

Referring to FIG. 1, the storage system 1 may include a host 10 and a storage device 20. In some example embodiments, the host 10 and the storage device 20 may be mounted on a board and may be connected to each other through patterns formed on the board.

In some example embodiments, the host 10 may include at least one core for processing instructions. In some example embodiments, the host 10 may include, as non-limiting examples, an application processor, a microprocessor, a central processing unit (CPU), a processor core, a multi-core processor, a multi-processor, an application-specific integrated circuit (ASIC), and a field programmable gate array (FPGA).

The host 10 may receive from the outside thereof, firmware $FW_{signed\ A}$ signed based on a first secret key $sKEY_A$ (which is hereinafter referred to as single-signed firmware). The single-signed firmware $FW_{signed\ A}$ may be understood as including firmware FW and an A signature SIG A generated based on the first secret key $sKEY_A$. Herein, firmware may be referred to as software or a program. Firmware may refer to software for controlling the storage device 20. For example, firmware of the storage device 20 may include a host interface layer (HIL), a flash translation layer (FTL), and a flash interface layer (FIL). The HIL may manage data transmission between the host 10 and a storage controller 21, the FTL may convert a logical address, which is received from the host 10, into a physical address of a non-volatile memory 22, and the FIL may manage data transmission between the storage controller 21 and the non-volatile memory 22.

The host 10 may receive the single-signed firmware $FW_{signed\ A}$ from a manufacturer of the storage device 20, a manufacturer of the storage system 1, or a supplier of the firmware FW (which is hereinafter referred to as a firmware distributor). The firmware distributor may generate the A signature SIG A for the firmware FW based on the first secret key $sKEY_A$, and may provide the firmware FW and the A signature SIG A to the host 10. The firmware distributor may manage the first secret key $sKEY_A$ not to be open to the outside. For example, the firmware distributor may manage the first secret key $sKEY_A$ by using a hardware security module (HSM) and may generate the single-signed firmware $FW_{signed\ A}$ based on the first secret key $sKEY_A$.

The host 10 may generate dual-signed firmware $FW_{signed\ A,\ B}$ by signing the single-signed firmware $FW_{signed\ A}$ based on a second secret key $sKEY_B$, and may provide the dual-signed firmware $FW_{signed\ A,\ B}$ to the storage device 20. The dual-signed firmware $FW_{signed\ A,\ B}$ may be understood as including the firmware FW, the A signature SIG A generated based on the first secret key $sKEY_A$, and a B signature SIG B generated based on the second secret key $sKEY_B$. Specifically, the host 10 may generate the B signature SIG B for the single-signed firmware $FW_{signed\ A}$ based on the second secret key $sKEY_B$, and may provide the single-signed firmware $FW_{signed\ A}$ and the B signature SIG B to the storage device 20. An example of a method of generating a signature may be described below with reference to FIG. 2.

The storage device 20 may include the storage controller 21 and the non-volatile memory 22.

The storage controller 21 may authenticate the firmware FW based on a first public key $pKEY_A$ and a second public key $pKEY_B$. The authentication of firmware is to determine the authenticity of the firmware and may refer to determining that the firmware is generated by an authenticated entity and firmware data is authentic. The authenticated firmware may refer to trustable firmware. In some example embodiments, when the B signature SIG B is verified based on the second public key $pKEY_B$, it may be authenticated that the single-signed firmware $FW_{signed\ A}$ is generated by the host 10. When the A signature SIG A is verified based on the first public key $pKEY_A$, it may be authenticated that the firmware FW is generated by the firmware distributor.

The storage controller 21 may store the authenticated dual-signed firmware $FW_{signed\ A,\ B}$. The storage controller 21 may authenticate the firmware FW by verifying the A signature SIG A and the B signature SIG B based on the first public key $pKEY_A$ and the second public key $pKEY_B$, during booting, and may execute the firmware FW based on verification results. The first public key $pKEY_A$ is a key related to the first secret key $sKEY_A$ and may be used to verify a signature (for example, the A signature SIG A) generated based on the first secret key $sKEY_A$. The first public key $pKEY_A$ may be provisioned into the storage controller 21 during the process of fabricating the storage controller 21. The second public key $pKEY_B$ is a key related to the second secret key $sKEY_B$ and may be used to verify a signature (for example, the B signature SIG B) generated based on the second secret key $sKEY_B$. The storage controller 21 may obtain the second public key $pKEY_B$ from the host 10.

The storage controller 21 according to some example embodiments of the inventive concepts may determine that the received firmware FW is the firmware FW transferred from an authentic firmware distributor and the authentic host 10, by performing authentication on the firmware FW based on the first public key $pKEY_A$ and the second public key $pKEY_B$.

The non-volatile memory 22 may not lose stored data even when the supply of power is terminated. The non-volatile memory 22 may include flash memory, magnetic random access memory (MRAM), phase-change random access memory (PRAM), resistive random access memory (RRAM), or the like. The non-volatile memory 22 may also include a storage medium, such as tape, a magnetic disk, or an optical disk. The storage controller 21 may provide data stored in the non-volatile memory 22 to the host 10 and may store data received from the host 10 in the non-volatile memory 22.

Figure 2:
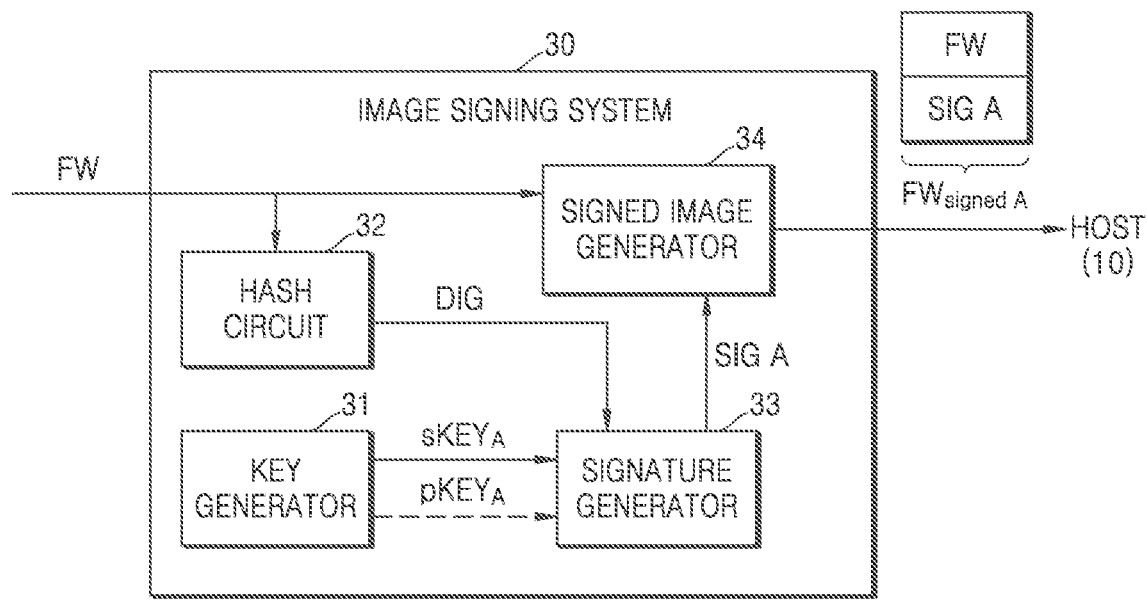
FIG. 2 is a block diagram illustrating an image signing system according to some example embodiments of the inventive concepts.

FIG. 2 is a block diagram illustrating an image signing system 30 according to some example embodiments of the inventive concepts. Descriptions regarding FIG. 2 may be made below with reference to FIG. 1. The image signing system 30 of FIG. 2 may be included in the firmware distributor described above with reference to FIG. 1. In this case, the image signing system 30 may receive the firmware FW and may generate the single-signed firmware $FW_{signed\ A}$ transferred to the host 10. In some example embodiments, the image signing system 30 may be included in the host 10. In this case, the image signing system 30 may receive the single signed firmware $FW_{signed\ A}$ and may generate the dual-signed firmware $FW_{signed\ A,\ B}$ Hereinafter, although the image signing system 30 is described as being included in the firmware distributor, example embodiments of the inventive concepts are not limited thereto.

The image signing system 30 may be implemented by any computing system. For example, components of the image signing system 30 may each be implemented by a hardware module designed by logic synthesis, a software module executed by at least one core, a processing unit including at least one core and a software module, and a combination thereof. The image signing system 30 may receive firmware transferred to the host 10. In some example embodiments, the image signing system 30 may receive the updated firmware FW. As shown in FIG. 2, the image signing system 30 may include a key generator 31, a hash circuit 32, a signature generator 33, and a signed image generator 34.

The key generator 31 may generate a key pair including the first secret key $sKEY_A$ and the first public key $pKEY_A$. For example, the key generator 31 may include a random number generator and may generate a key pair based on a random number. In some example embodiments, the key generator 31 may be omitted, and the image signing system 30 may receive at least one of key pairs from outside thereof.

The hash circuit 32 may receive the firmware FW and generate a digest DIG regarding the firmware FW. The digest DIG may refer to a hash value generated based on a hash algorithm, such as a secure hash algorithm (SHA).

The signature generator 33 may receive the first secret key $sKEY_A$ from the key generator 31 and may generate a digital signature, that is, the A signature SIG A, for the digest DIG based on the first secret key $sKEY_A$. The A signature SIG A may be generated based on any signature algorithm, for example, may be generated from the first secret key $sKEY_A$ based on an elliptic curve digital signature algorithm (ECDSA). In some example embodiments, the signature generator 33 may also receive the first public key $pKEY_A$, as shown in FIG. 2, and may generate the A signature SIG A based on the first secret key $sKEY_A$ and the first public key $pKEY_A$.

The signed image generator 34 may receive the firmware FW and the A signature SIG A and may generate the single-signed firmware $FW_{signed\ A}$. That is, the single-signed firmware $FW_{signed\ A}$ may include the firmware FW and the A signature SIG A. In some example embodiments, the signed image generator 34 may generate the single-signed firmware $FW_{signed\ A}$ and the first public key $pKEY_A$ in the form of one digital envelope and may transfer the generated digital envelope to the host 10.

Although the process, in which the image signing system 30 generates the A signature SIG A for the firmware FW, has been described above, the image signing system 30 may generate a signature for any firmware, program, software, or data. Herein, data targeted by a signature may be referred to as a message MSG.

Figure 3:
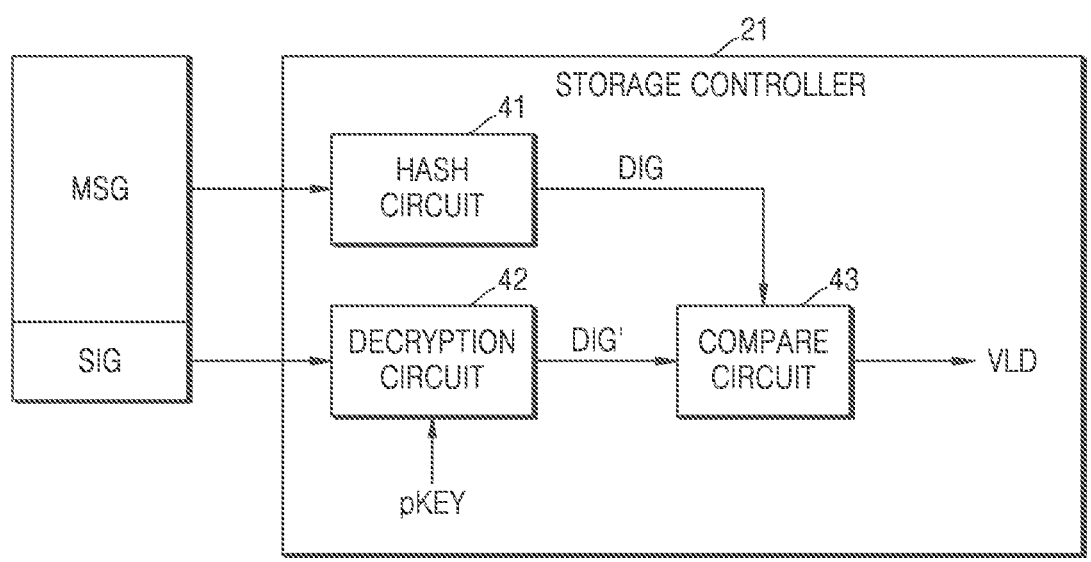
FIG. 3 is a diagram illustrating a method of authenticating firmware, according to some example embodiments of the inventive concepts.

FIG. 3 is a diagram illustrating a method of authenticating firmware, according to some example embodiments of the inventive concepts. Although FIG. 3 illustrates the storage controller 21, components of the storage controller 21 of FIG. 3 may also be included in the host 10 of FIG. 1.

Referring to FIG. 3, the storage controller 21 may receive a message MSG and a signature SIG for the message MSG and verify the signature SIG, based on a public key pKEY, thereby determining that the message MSG is generated by an authentic entity. In some example embodiments, the message MSG may be the single-signed firmware $FW_{signed\ A}$ or the dual-signed firmware $FW_{signed\ A,B}$.

The storage controller 21 may include a hash circuit 41, a decryption circuit 42, and a compare circuit 43. The hash circuit 41 may generate a digest DIG regarding the message MSG, based on a hash algorithm. The decryption circuit 42 may generate a comparison target digest DIG' by decrypting the signature SIG, based on the public key pKEY. In some example embodiments, the public key pKEY may be the first public key $pKEY_A$ or the second public key $pKEY_B$. The compare circuit 43 may generate validity information VLD by comparing the digest DIG with the comparison target digest DIG'. The validity information VLD may be information indicating that the message MSG is generated by an authentic entity.

For example, the hash circuit 41 may generate the digest DIG of the single-signed firmware $FW_{signed\ A}$. The decryption circuit 42 may generate the comparison target digest DIG' by decrypting the B signature SIG B, based on the authenticated second public key $pKEY_B$. The compare circuit 43 may compare the digest DIG with the comparison target digest DIG' and may output the validity information VLD, based on a comparison result. The validity information VLD may be information indicating that the single-signed firmware $FW_{signed\ A}$ is generated by an authentic entity, that is, the host 10. When it is determined by the validity information VLD that the single-signed firmware $FW_{signed\ A}$ is generated by the authentic entity, the storage controller 21 may authenticate the firmware FW, based on the firmware FW, the A signature SIG A, and the first public key $pKEY_A$. The hash circuit 41 may generate the digest DIG of the firmware FW. The decryption circuit 42 may generate the comparison target digest DIG by decrypting the A signature SIG A, based on the first public key $pKEY_A$. The compare circuit 43 may compare the digest DIG with the comparison target digest DIG' and may output the validity information VLD, based on a comparison result. The validity information VLD may be information indicating that the firmware FW is generated by an authentic entity, that is, a firmware distributor.

Figure 4:
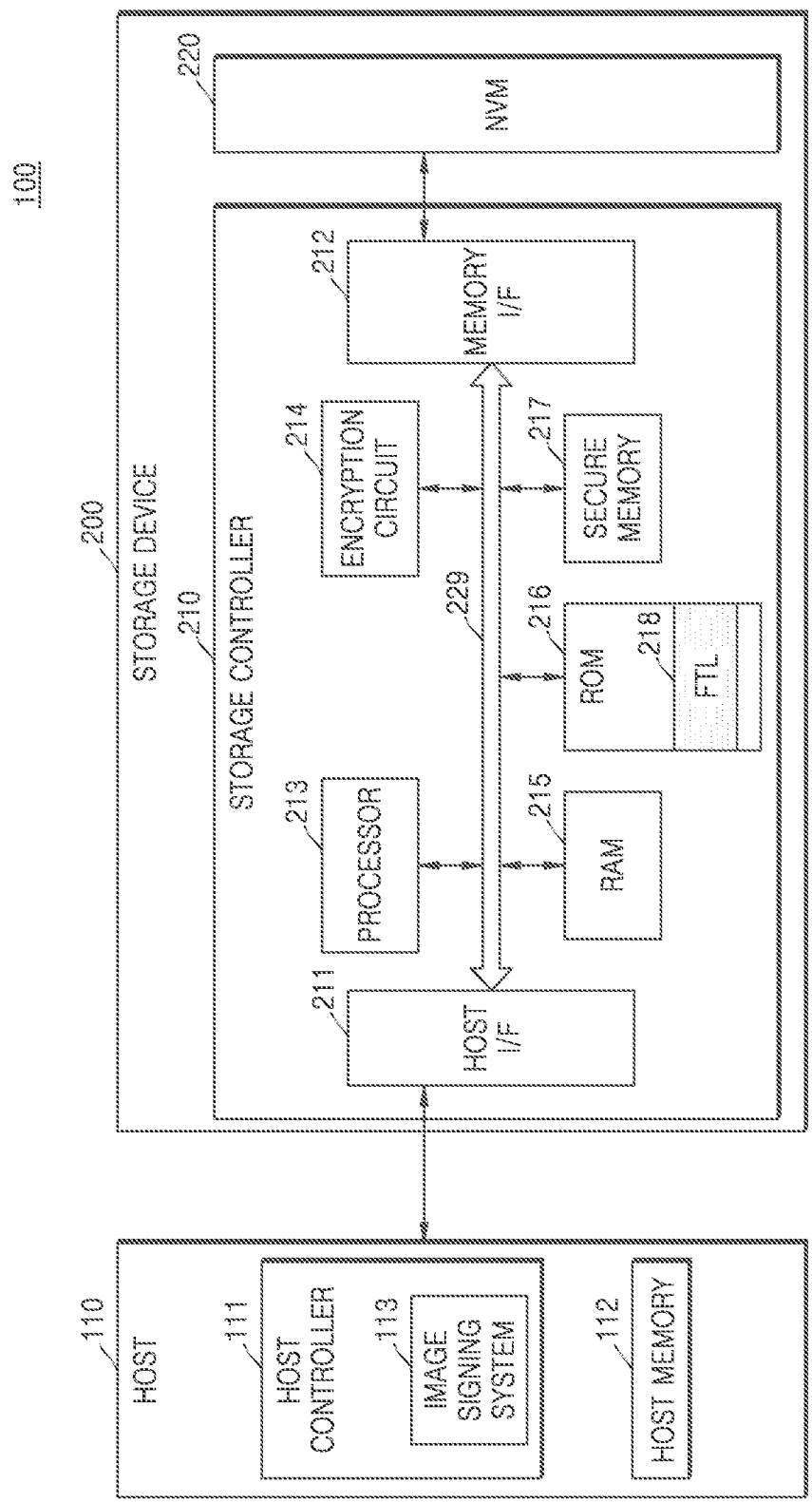
FIG. 4 is a block diagram illustrating a storage system according to some example embodiments of the inventive concepts.

FIG. 4 is a block diagram illustrating a storage system 100 according to some example embodiments of the inventive concepts.

Referring to FIG. 4, the storage system 100 may include a host 110 and a storage device 200. In addition, the storage device 200 may include a storage controller 210 and a non-volatile memory 220. Furthermore, according to some example embodiments of the inventive concepts, the host 110 may include a host controller 111 and a host memory 112. The host memory 112 may function as a buffer memory for temporarily storing data to be transmitted to the storage device 200 or data transmitted from the storage device 200. In some example embodiments, as described below with reference to FIG. 5, data stored in the host memory 112 may include the dual-signed firmware $FW_{signed\ A}$, B, the second public key $pKEY_B$, a request Req, or a signature SIG A[$pKEY_B$, Req] for the second public key $pKEY_B$ and the request Req. In some example embodiments, as described below with reference to FIG. 7, the data stored in the host memory 112 may include the dual-signed firmware $FW_{signed\ A}$, B, a third public key $pKEY_C$, a signature SIG A[$pKEY_C$] for the third public key $pKEY_C$, the second public key $pKEY_B$, or a signature SIG C[$pKEY_B$] for the second public key $pKEY_B$.

The storage device 200 may include storage media for storing data according to a request from the host 110. For example, the storage device 200 may include at least one of a solid state drive (SSD), an embedded memory, and a removable external memory. When the storage device 200 includes an SSD, the storage device 200 may be a device conforming to the non-volatile memory express (NVMe) specification. When the storage device 200 includes an embedded memory or an external memory, the storage device 200 may be a device conforming to the universal flash storage (UFS) or embedded multi-media card (eMMC) specification. Each of the host 110 and the storage device 200 may generate a packet according to an employed standard protocol and transmit the packet.

When the non-volatile memory 220 of the storage device 200 includes flash memory, the flash memory may include a 2-dimensional (2D) NAND memory array or a 3-dimensional (3D) (or vertical) NAND (VNAND) memory array. As another example, the storage device 200 may include other various types of non-volatile memory. For example, magnetic RAM (MRAM), spin-transfer torque MRAM, conductive bridging RAM (CBRAM), ferroelectric RAM (FeRAM), phase-change RAM (PRAM), resistive RAM (RRAM), and other various types of memory may be applied to the storage device 200.

According to some example embodiments, the host controller 111 and the host memory 112 may be respectively implemented by separate semiconductor chips. Alternatively, in some example embodiments, the host controller 111 and the host memory 112 may be integrated into the same semiconductor chip. For example, the host controller 111 may be one of a large number of modules included in an application processor, and the application processor may be implemented by a system-on-chip (SoC). In addition, the host memory 112 may be an embedded memory included in the application processor, or a non-volatile memory or a memory module, which is arranged outside the application processor.

The host controller 111 may manage an operation of storing data, which is stored in the host memory 112, in the storage device 200, or an operation of storing data of the storage device 200 in the host memory 112. In some example embodiments, the host controller 111 may include an image signing system 113. In some example embodiments, the image signing system 113 may have the same structure as the image signing system 30 of FIG. 2. The image signing system 113 may generate a signature, based on a unique secret key, for example, a second secret key $sKEY_B$ or a third secret key $sKEY_C$. In some example embodiments, as described below with reference to FIG. 7, the image signing system 113 may generate a signature SIG C[$pKEY_B$] for the second public key $pKEY_B$, based on the third secret key $sKEY_C$ that is unique.

The storage controller 210 may include a host interface 211, a memory interface 212, a processor 213, an encryption circuit 214, RAM 215, read-only memory (ROM) 216, and a secure memory 217. Herein, the RAM 215 may be referred to as a system memory. In some example embodiments, the ROM 216 may include programmable read-only memory (PROM), erasable programmable read-only memory (EPROM), electrically erasable programmable read-only memory (EEPROM), or flash memory.

The host interface 211 may transmit a packet to and receive a packet from the host 110. The packet transmitted from the host 110 to the host interface 211 may include a command, data to be written to the non-volatile memory 220, data to be written to a storage space (for example, the ROM 216 or the secure memory 217) in the storage controller 210, or the like, and the packet transmitted from the host interface 211 to the host 110 may include a response to a command, data read from the non-volatile memory 220, or the like. Data in operation S540 of FIG. 5 and data in operation S740 of FIG. 7 may be received by the storage device 200 through the host interface 211.

The memory interface 212 may transmit data, which is to be written to the non-volatile memory 220, to the non-volatile memory 220 or receive data read from the non-volatile memory 220. The memory interface 212 may be implemented to conform to a standard specification, such as Toggle or ONFI.

The processor 213 may further include a hardware accelerator designed to perform a predefined operation (or alternatively, a desired operation) at a high speed, an input/output (I/O) interface providing a communication channel with an external component of the processor 213 or the like. In some example embodiments, components of the processor 213 may be integrated into a single chip or a single die, and the processor 213 may be referred to as an SoC. In some example embodiments, the components of the processor 213 may be integrated into two or more chips included in one package, and the processor 213 may be referred to as a system-in-package (SiP). The processor 213 may be referred to as a micro-control unit (MCU).

In some example embodiments, the processor 213 may execute instructions included in a software (for example, the FTL 218) image stored in the ROM 226. For example, at least some of the instructions included in the software image stored in the ROM 226 may be copied to a cache included in the processor 213 or to the RAM 225, and the processor 213 may execute the copied instructions.

The encryption circuit 214 may perform at least one of an encryption operation and a decryption operation on data, which is input to the storage controller 210, by using a symmetric-key algorithm.

The RAM 215 may temporarily store data used by the processor 213. For example, the RAM 215 may temporarily store data, which is read from the ROM 216, the secure memory 217, or the non-volatile memory 220, or data to be written to the ROM 216, the secure memory 217, or the non-volatile memory 220. In addition, the RAM 215 may temporarily store instructions executed by the processor 213. In some example embodiments, the RAM 215 may include a volatile memory providing a relatively high operating speed, such as dynamic random access memory (DRAM) or static random access memory (SRAM).

The ROM 216 may store the software image, which is executed by the processor 213, in a non-volatile manner In some example embodiments, the ROM 216 may store a firmware (for example, the FTL 218) image. In addition, as shown in FIG. 9, the ROM 216 may store a digital signature (for example, the A signature SIG A or the B signature SIG B in FIG. 1) for the software image. As shown in FIG. 8, the ROM 216 may store an authentication state table, which indicates a plurality of authentication states, and a state value, which indicates a current authentication state of the storage controller 210.

The FTL 218 may perform several functions, such as address mapping, wear-leveling, and garbage collection. The address mapping is an operation of converting a logical address, which is received from the host 110, into a physical address, which is actually used to store data in the non-volatile memory 220. The wear-leveling is a technique for preventing excessive deterioration of a specific block by causing blocks in the non-volatile memory 220 to be uniformly used, and, for example, the wear-leveling may be implemented by a firmware technique for balancing erasure counts of physical blocks. The garbage collection is a technique for securing an available capacity in the non-volatile memory 220 by a method of copying valid data of a block to a new block and then erasing the existing block.

In some example embodiments, as shown in FIG. 9, when power starts to be supplied to the storage controller 210 or the storage controller 210 is reset, the ROM 216 may store a bootloader, which includes instructions executed by priority by the processor 213, and a firmware image executed by the bootloader.

The secure memory 217 may store unique data of the storage controller 210 in a non-volatile manner In some example embodiments, the secure memory 217 may store information used to authenticate a software image loaded on the RAM 215 by the storage device after the first signature and the second signature are verified. For example, the secure memory 217 may store at least one public key (for example, the first public key $pKEY_A$ or the second public key $pKEY_B$) used to verify a digital signature. In some example embodiments, the secure memory 217 may include a one-time-programmable (OTP) memory, such as an anti-fuse array.

In some example embodiments, the processor 213 may verify a signature for the FTL 218, based on a public key (for example, the first public key $pKEY_A$ or the second public key $pKEY_B$), before storing the FTL 218, which is received from the host 110, in the ROM 216. In some example embodiments, the processor 213 may verify the signature for the FTL 218, based on the public key, before executing the FTL 218 stored in the ROM 216.

Specifically, the processor 213 may verify the A signature SIG A for the FTL 218, based on the first public key $pKEY_A$, and may authenticate the FTL 218 by verifying the B signature SIG B for the FTL 218, based on the second public key $pKEY_B$. The processor 213 may store the FTL 218, the A signature SIG A, and the B signature SIG B, which are received from the host 110, in the ROM 216 or execute the FTL 218 stored in the ROM 216, based on an authentication result. A process of authenticating firmware may be described below with reference to FIG. 10.

Figure 5:
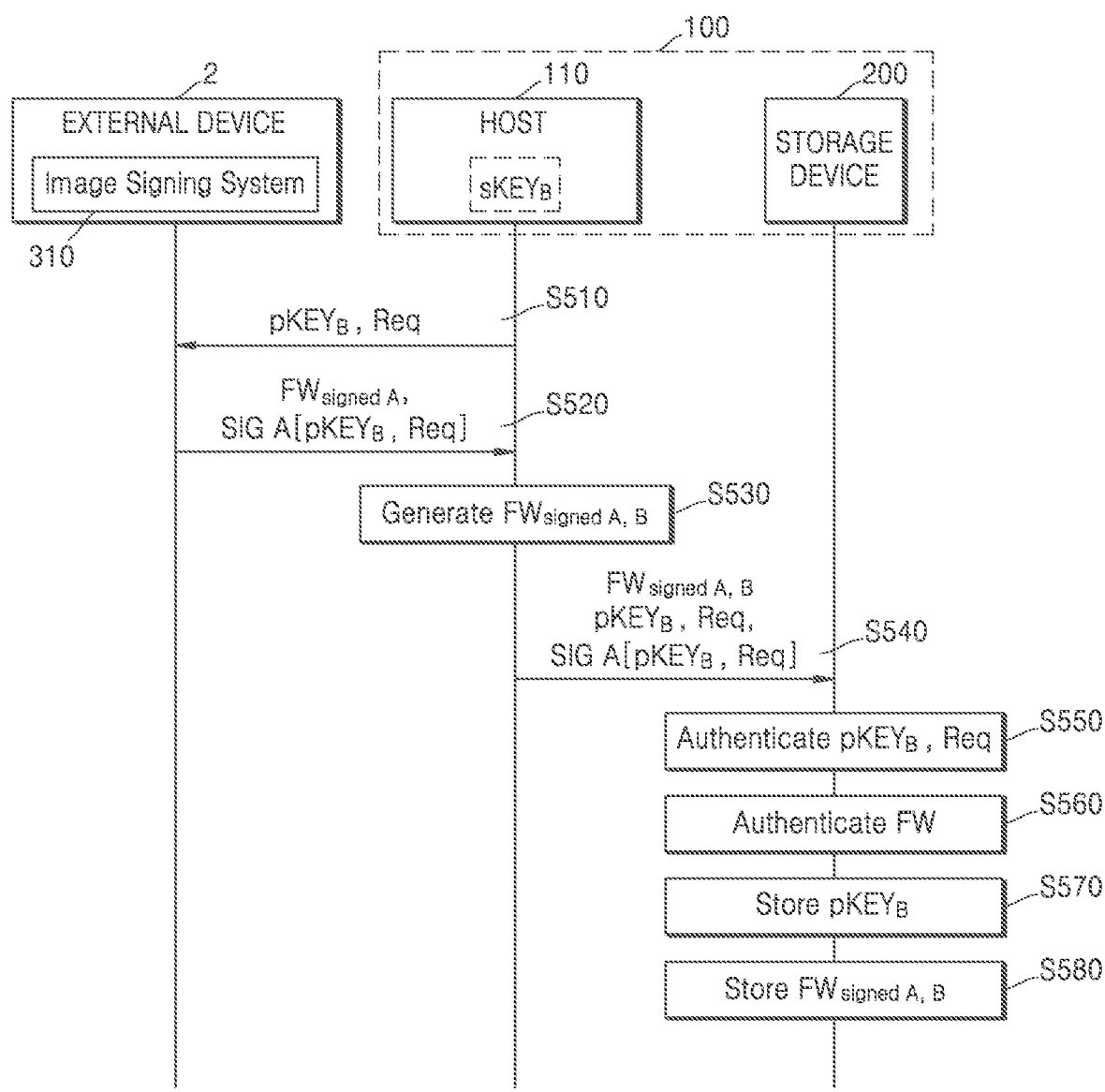
FIG. 5 is a diagram illustrating a method of storing dual-signed firmware, according to some example embodiments of the inventive concepts.

FIG. 5 is a diagram illustrating a method of storing dual-signed firmware, according to some example embodiments of the inventive concepts. Descriptions regarding FIG. 5 may be made below with reference to FIG. 4.

Referring to FIG. 5, the storage system 100 may receive the single-signed firmware $FW_{signed\ A}$ from an external device 2, may generate the B signature SIG B for the single-signed firmware $FW_{signed\ A}$, based on the second secret key $sKEY_B$, and may store the dual-signed firmware $FW_{signed\ A,\ B}$. The external device 2 may include an image signing system 310 and may correspond to a firmware distributor. The image signing system 310 may be an example of the image signing system 30 of FIG. 2. The storage system 100 and the external device 2 may transmit data to and receive data from each other through a secure channel.

Specifically, in operation S510, the host 110 may transfer the second public key $pKEY_B$ and the request Req to the external device 2. The request Req may include information for requesting a signature for the second public key $pKEY_B$, based on the first secret key $sKEY_A$.

In operation S520, the external device 2 may transfer, to the host 110, the single-signed firmware $FW_{signed\ A}$ generated based on the first secret key $sKEY_A$. In addition, the external device 2 may generate a signature SIG A[$pKEY_B$, Req] for the second public key $pKEY_B$ and the request Req, based on the first secret key $sKEY_A$, and may transfer the generated signature SIG A[$pKEY_B$, Req] to the host 110.

In operation S530, the host 110 may generate the dual-signed firmware $FW_{signed\ A,\ B}$. Specifically, the host 110 may generate a key pair including the second secret key $sKEY_B$ and the second public key $pKEY_B$. The host 110 may generate a digest regarding the single-signed firmware $FW_{signed\ A}$ and may generate a digital signature for the digest, that is, the B signature SIG B, based on the second secret key $sKEY_B$. The host 110 may generate the dual-signed firmware $FW_{signed\ A}$, B including the single-signed firmware $FW_{signed\ A}$ and the B signature SIG B. In some example embodiments, the host 110 may include the image signing system 30 of FIG. 2.

In operation S540, the host 110 may provide, to the storage device 200, the dual-signed firmware $FW_{signed\ A}$, B, the second public key $pKEY_B$, the request Req, and the signature SIG A[$pKEY_B$, Req] for the second public key $pKEY_B$ and the request Req.

In operation S550, the storage device 200 may authenticate the second public key $pKEY_B$ and the request Req, which are signed. Specifically, the storage device 200 may verify the signature SIG A[$pKEY_B$, Req] for the second public key $pKEY_B$ and the request Req, based on the first public key $pKEY_A$ provisioned during the fabrication thereof. In some example embodiments, the storage controller 210 included in the storage device 200 may correspond to the storage controller 21 of FIG. 3.

That is, in operation S550, the storage device 200 may obtain the digest DIG regarding the second public key $pKEY_B$ and the request Req, may obtain the comparison target digest DIG' by decrypting the signature SIG A[$pKEY_B$, Req], based on the first public key $pKEY_A$, and may authenticate the second public key $pKEY_B$ and the request Req by comparing the digest DIG with the comparison target digest DIG'. That is, the storage device 200 may determine that the second public key $pKEY_B$ and the request Req are authenticated by the external device 2.

In operation S560, the storage device 200 may authenticate the firmware FW. Specifically, by verifying the A signature SIG A and the B signature SIG B, based on the first public key $pKEY_A$ and the second public key $pKEY_B$, the storage device 200 may determine that the firmware FW is authenticated by the external device 2 and a firmware distributor. In some example embodiments, the storage device 200 may authenticate the single-signed firmware $FW_{signed\ A}$ by verifying the B signature SIG B, based on the second public key $pKEY_B$, and may authenticate the firmware FW by verifying the A signature SIG A, based on the first public key $pKEY_A$.

In operation S570, the storage device 200 may store the second public key $pKEY_B$. That is, because the second public key $pKEY_B$ is trustable through operation S550, the storage device 200 may store the second public key $pKEY_B$. The second public key $pKEY_B$ may be used to verify a signature generated based on the second secret key $sKEY_B$. In some example embodiments, the second public key $pKEY_B$ may be stored in the secure memory 217.

In operation S580, the storage device 200 may store the dual-signed firmware $FW_{signed\ A,\ B}$. That is, because the firmware is trustable through operation S560, the storage device 200 may store the firmware FW, the A signature SIG A, and the B signature SIG B. The storage device 200 may verify the A signature SIG A and the B signature SIG B, based on the first public key $pKEY_A$ and the second public key $pKEY_B$, before executing the firmware FW, and may execute the firmware FW, based on verification results. In some example embodiments, the dual-signed firmware $FW_{signed\ A}$, B may be stored in the ROM 216.

In some example embodiments, after storing the dual-signed firmware $FW_{signed\ A}$, B, the storage device 200 may change an authentication state, as described below with reference to FIG. 8.

Figure 6:
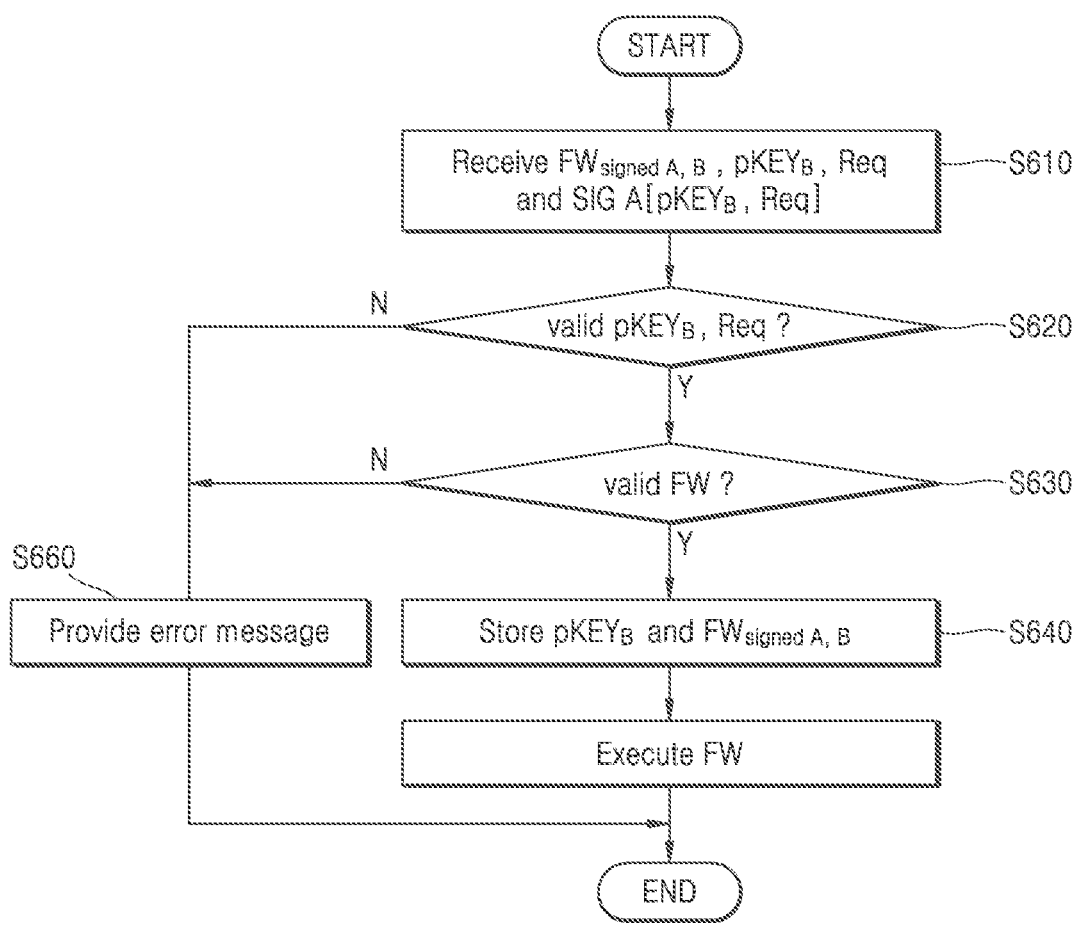
FIG. 6 is a flowchart illustrating a method of operating a storage device, according to some example embodiments of the inventive concepts.

FIG. 6 is a flowchart illustrating a method of operating a storage device, according to some example embodiments of the inventive concepts. The method of operating a storage device may include a plurality of operations S610 to S660. Descriptions regarding FIG. 6 may be made below with reference to FIG. 4.

In operation S610, the storage device 200 may receive the dual-signed firmware $FW_{signed\ A}$, B, the second public key $pKEY_B$, the request Req, and the signature SIG A[$pKEY_B$, Req] for the second public key $pKEY_B$ and the request Req. In some example embodiments, the storage device 200 may not receive the request Req and may receive the second public key $pKEY_B$ and a signature SIG $A[pKEY_B]$ for the second public key $pKEY_B$.

In operation S620, the storage device 200 may determine whether the second public key $pKEY_B$ and the request Req are valid. Specifically, the storage device 200 may determine the validity of the second public key $pKEY_B$ and the request Req by verifying the signature SIG $A[pKEY_B, Req]$ for the second public key $pKEY_B$ and the request Req, based on the first public key $pKEY_A$. Performing determination of the validity may be understood as performing authentication. When the second public key $pKEY_B$ and the request Req are valid, operation S630 may be performed, and when the second public key $pKEY_B$ and the request Req are not valid, operation S660 may be performed.

In operation S630, the storage device 200 may determine whether the firmware FW is valid. Specifically, the storage device 200 may determine the validity of the single-signed firmware $FW_{signed\ A}$ by verifying the B signature SIG B, based on the second public key $pKEY_B$ determined to be valid in operation S620. Next, the storage device 200 may determine the validity of the firmware FW by verifying the A signature SIG A, based on the first public key $pKEY_A$. When the single-signed firmware $FW_{signed\ A}$ and the firmware FW are valid, operation S640 may be performed, and when the single-signed firmware $FW_{signed\ A}$ or the firmware FW are not valid, operation S660 may be performed.

In operation S650, the storage device 200 may execute the firmware FW. Specifically, by determining the validity of the firmware FW, the storage device 200 may execute the firmware FW that is trustable. In some example embodiments, during every booting, the storage device 200 may verify the A signature SIG A and the B signature SIG B, based on the first public key $pKEY_A$ and the second public key $pKEY_B$, and may execute the firmware FW, based on a verification result.

In operation S660, the storage device 200 may provide, to the host 110, an error message indicating that the authentication of the second public key $pKEY_B$, the request Req, or the firmware FW has failed. The error message may also include information indicating booting failure.

Figure 7:
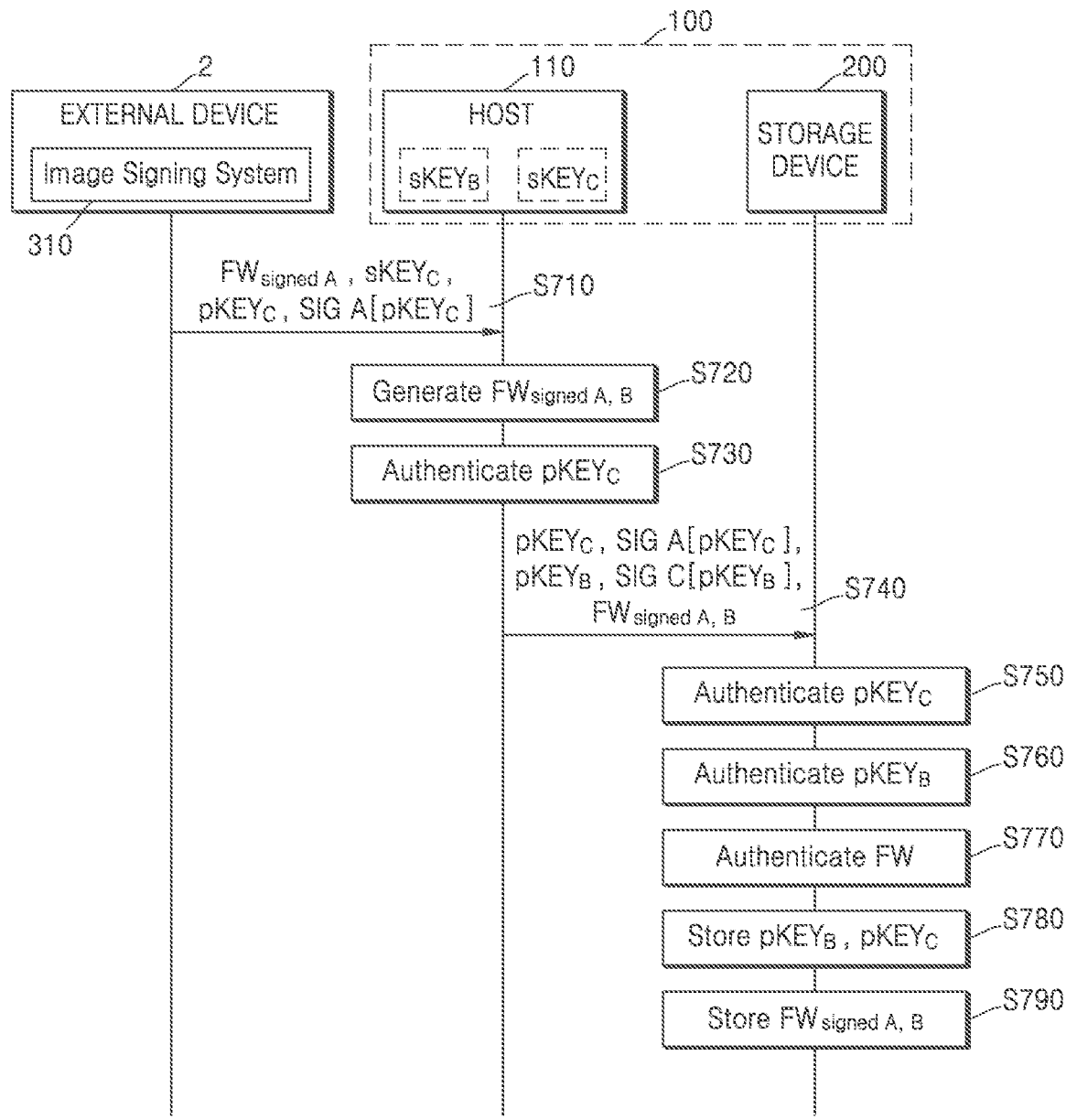
FIG. 7 is a diagram illustrating a method of storing dual-signed firmware, according to some example embodiments of the inventive concepts.

FIG. 7 is a diagram illustrating a method of storing dual-signed firmware, according to some example embodiments of the inventive concepts. Descriptions regarding FIG. 7 may be made below with reference to FIG. 4.

Referring to FIG. 7, the storage system 100 may receive the single-signed firmware $FW_{signed\ A}$ from the external device 2, may generate the B signature SIG B for the single-signed firmware $FW_{signed\ A}$ based on the second secret key $sKEY_B$, and may store the dual-signed firmware $FW_{signed\ A,\ B}$. The external device 2 may include the image signing system 310 of FIG. 2 and may correspond to a firmware distributor. The storage system 100 and the external device 2 may transmit and receive data with respect to each other through a secure channel.

Specifically, in operation S710, the external device 2 may transfer, to the host 110, the single-signed firmware $FW_{signed\ A}$, the third secret key $sKEY_C$, the third public key $pKEY_C$, and a signature SIG $A[pKEY_C]$ for the third public key $pKEY_C$, which is generated based on the first secret key $sKEY_A$. The third public key $pKEY_C$ may be a public key used to verify a signature generated based on the third secret key $sKEY_C$. In some example embodiments, the external device 2 may generate a signature for the third secret key $sKEY_C$ based on the first secret key $sKEY_A$, and may provide the generated signature to the host 110.

In operation S720, the host 110 may generate the dual-signed firmware $FW_{signed\ A,\ B}$. Specifically, the host 110 may generate the B signature SIG B for the single-signed firmware $FW_{signed\ A}$ based on the second secret key $sKEY_B$ unique to the host 110, and may generate the dual-signed firmware $FW_{signed\ A,\ B}$ by coupling the single-signed firmware $FW_{signed\ A}$ with the B signature SIG B. In some example embodiments, the host 110 may include the image signing system 30 of FIG. 2.

In operation S730, the host 110 may authenticate the third public key $pKEY_C$. Specifically, the host 110 may authenticate the third public key $pKEY_C$ by verifying the signature SIG $A[pKEY_C]$ for the third public key $pKEY_C$ based on the first public key $pKEY_A$ stored in the storage device 200. In some example embodiments, the host 110 may authenticate the third secret key $sKEY_C$ by verifying the signature for the third secret key $sKEY_C$ based on the first secret key $sKEY_A$. In some example embodiments, the host 110 may include the components of the storage controller 21 described above with reference to FIG. 4.

In operation S740, the host 110 may transfer, to the storage device 200, the authenticated third public key $pKEY_C$, the signature SIG $A[pKEY_C]$ for the third public key $pKEY_C$, which is generated based on the first secret key $sKEY_A$, the second public key $pKEY_B$, the signature SIG $C[pKEY_B]$ for the second public key $pKEY_B$, which is generated based on the third secret key $sKEY_C$, and the dual-signed firmware $FW_{signed\ A,\ B}$. In operation S740, the host 110 may generate the signature SIG $C[pKEY_B]$ for the second public key $pKEY_B$ based on the third secret key $sKEY_C$.

In operation S750, the storage device 200 may authenticate the third public key $pKEY_C$. Specifically, the storage device 200 may authenticate the signature SIG $A[pKEY_C]$ for the third public key $pKEY_C$ based on the first public key $pKEY_A$ provisioned during the fabrication thereof. In some example embodiments, the storage device 200 may include the storage controller 21 described above with reference to FIG. 4.

In operation S760, the storage device 200 may authenticate the second public key $pKEY_B$. Specifically, the storage device 200 may authenticate the signature SIG $C[pKEY_B]$ for the second public key $pKEY_B$, based on the authenticated third public key $pKEY_C$.

In operation S770, the storage device 200 may authenticate the firmware FW. Specifically, the storage device 200 may verify the A signature SIG A and the B signature SIG B of the dual signed firmware $FW_{signed\ A,\ B}$ based on the first public key $pKEY_A$ and the second public key $pKEY_B$. In some example embodiments, operation S770 may be the same as operation S560 of FIG. 5.

In operation S780, the storage device 200 may store the second public key $pKEY_B$ and the third public key $pKEY_C$, which are authenticated. In some example embodiments, the second public key $pKEY_B$ and the third public key $pKEY_C$ may be stored in the secure memory 217.

In operation S790, the storage device 200 may store the dual-signed firmware $FW_{signed\ A,\ B}$. Specifically, the storage device 200 may store the firmware FW, the A signature SIG A, and the B signature SIG B. The storage device 200 may verify the A signature SIG A and the B signature SIG B based on the first public key $pKEY_A$ and the second public key $pKEY_B$, before executing the firmware FW, and may execute the firmware FW based on verification results. In some example embodiments, the dual-signed firmware $FW_{signed\ A,\ B}$ may be stored in the ROM 216.

Although not shown, after storing the dual-signed firmware $FW_{signed\ A,\ B}$, the storage device 200 may change an authentication state, as described below with reference to FIG. 8.

FIG. 8 is a diagram illustrating an authentication state table and state transition, according to some example embodiments of the inventive concepts. Descriptions regarding FIG. 8 may be described below with reference to FIG. 4.

Referring to FIG. 8, the authentication state table may include information regarding signatures (for example, SIG A and SIG B) verified to execute firmware. In addition, the authentication state table may include information indicating which of an external device ExDv and a host HOST has authority to select whether to verify the B signature SIG B to execute the firmware. The external device ExDv may correspond to the external device 2 of FIG. 5 or 7. In some example embodiments, the authentication state table may be stored in the ROM 216 of FIG. 4. Alternatively, the authentication state table may be stored in a separate OTP memory in the storage controller 210. In some example embodiments, the authentication state table may be stored in the non-volatile memory 220 and loaded on the RAM 215 during booting.

Referring to FIG. 8, a first state State 1 may be a state in which, to execute the firmware, the A signature SIG A generated based on the first secret key $sKEY_A$ is verified and the B signature SIG B generated based on the second secret key $sKEY_B$ is not verified. In addition, the first state State 1 may be a state in which, to execute the firmware, the external device ExDv has authority to select whether to verify the B signature SIG B. For example, in operation S510 of FIG. 5, although the host 110 has provided the second public key $pKEY_B$ and the request Req to the external device 2, the external device 2 may deny the request Req and provide only the single-signed firmware $FW_{signed\ A}$, in operation S520. In this case, the second public key $pKEY_B$ and the request Req may not be authenticated by the external device 2. In the first state State 1, in operation S530, the host 110 may not generate the dual-signed firmware $FW_{signed\ A}$, B and may provide, to the storage device 200, only the single-signed firmware $FW_{signed\ A}$ received from the external device 2. In the first state State 1, the storage device 200 may verify the A signature SIG A based on the first public key $pKEY_A$ provisioned during the fabrication thereof, and may store or execute the single-signed firmware $FW_{signed\ A}$ based on a verification result.

A second state State 2 may be a state in which, to execute the firmware, the A signature SIG A generated based on the first secret key $sKEY_A$ is verified and the B signature SIG B generated based on the second secret key $sKEY_B$ is not verified. In addition, the second state State 2 may be a state in which, to execute the firmware, a host has authority to select whether to verify the B signature SIG B. For example, as shown in FIG. 7, because the external device 2 does not authenticate the second public key $pKEY_B$, the host 110 may have authority to authenticate the second public key $pKEY_B$ to verify the B signature SIG B. However, unlike operation S720 of FIG. 7, in the second state State 2, the host 110 may not generate the dual-signed firmware $FW_{signed\ A,\ B}$ and may provide, to the storage device 200, only the single-signed firmware $FW_{signed\ A}$ received from the external device 2. In the second state State 2, the storage device 200 may verify the A signature SIG A based on the first public key $pKEY_A$ provisioned during the fabrication thereof, and may store or execute the single-signed firmware FW signed A based on a verification result.

A third state State 3 may be a state in which, to execute the firmware, the A signature SIG A generated based on the first secret key $sKEY_A$ and the B signature SIG B generated based on the second secret key $sKEY_B$ are verified. In addition, the third state State 3 may be a state in which, to execute the firmware, the external device ExDv has authority to select whether to verify the B signature SIG B. For example, in operation S520 of FIG. 5, when the external device 2 transfers, to the host 110, the signature SIG A[$pKEY_B$, Req] for the second public key $pKEY_B$, which is generated based on the first secret key $sKEY_A$, the second public key $pKEY_B$ may be authenticated based on the first public key $pKEY_A$ provisioned into the storage device 200 during the fabrication thereof. In the third state State 3, because the second public key $pKEY_B$ may be authenticated by the external device 2, the host 110 may perform operations S530 and S540 shown in FIG. 5. In the third state State 3, the storage device 200 may verify the A signature SIG A and the B signature SIG B based on the first public key $pKEY_A$ provisioned during the fabrication thereof and the authenticated second public key $pKEY_B$, and may store or execute the dual-signed firmware $FW_{signed\ A,\ B}$ based on verification results. After operation S580 is performed according to the example embodiments of FIG. 5, the authentication state of the storage system 100 may be changed to the third state State 3.

A fourth state State 4 may be a state in which, to execute the firmware, the A signature SIG A generated based on the first secret key $sKEY_A$ and the B signature SIG B generated based on the second secret key $sKEY_B$ are verified. In addition, the fourth state State 4 may be a state in which, to execute the firmware, a host has authority to select whether to verify the B signature SIG B. For example, as shown in FIG. 7, because the external device 2 does not authenticate the second public key $pKEY_B$, the host 110 may have authority to authenticate the second public key $pKEY_B$ to verify the B signature SIG B. As shown in FIG. 7, in the fourth state State 4, the host 110 may generate the dual-signed firmware $FW_{signed\ A,\ B}$ and may provide, to the storage device 200, the signature SIG C[$pKEY_B$] for the second public key $pKEY_B$ generated based on the dual-signed firmware $FW_{signed\ A,\ B}$ and the unique third secret key $sKEY_C$. Like operations S750 and S760 of FIG. 7, in the fourth state State 4, the storage device 200 may authenticate the third public key $pKEY_C$, based on the first public key $pKEY_A$ provisioned during the fabrication thereof, and may authenticate the second public key $pKEY_B$ based on the authenticated third public key $pKEY_C$. In addition, like operation S770, the storage device 200 may verify the A signature SIG A, based on the first public key $pKEY_A$, may verify the B signature SIG B based on the authenticated second public key $pKEY_B$, and may store or execute the dual-signed firmware $FW_{signed\ A}$, B based on verification results. After operation S790 is performed according to the example embodiments of FIG. 7, the authentication state of the storage system 100 may be changed to the fourth state State 4.

The storage controller 210 may change the authentication state of the storage system 100 by changing a state value indicating an authentication state. The state value may be stored in the ROM 216, which is included in the storage controller 210, or an OTP memory.

FIG. 9 is a diagram illustrating data stored in the ROM 216 and the secure memory 217 for each authentication state, according to some example embodiments of the inventive concepts. Descriptions regarding FIG. 9 may be made with reference to FIGS. 4 and 8.

Referring to FIG. 9, when the authentication state of the storage controller 210 is the first state State 1, the ROM 216 may store the single-signed firmware $FW_{signed\ A}$, that is, the firmware FW and the A signature SIG A, and the secure memory 217 may store the first public key $pKEY_A$. The firmware FW, the A signature SIG A, and the first public key $pKEY_A$ may be data provisioned during the fabrication of the storage controller 210. The A signature SIG A may be a digital signature generated with respect to firmware based on the first secret key $sKEY_A$. In the first state State 1, before executing the firmware FW, the storage controller 210 may verify the A signature SIG A based on the first public key $pKEY_A$ stored in the secure memory 217. In some example embodiments, the first state State 1 may be a state directly after the storage controller 210 is fabricated. When the authentication state of the storage controller 210 is the second state State 2, the same data as the data in the first state State 1 may be stored in the ROM 216 and the secure memory 217.

Referring to FIG. 9, when the authentication state of the storage controller 210 is the third state State 3, the ROM 216 may store the dual-signed firmware $FW_{signed\ A,\ B}$, that is, the firmware FW, the A signature SIG A, and the B signature SIG B, and the secure memory 217 may store the first public key $pKEY_A$ and the second public key $pKEY_B$. The B signature SIG B may be a digital signature generated with respect to the single-signed firmware $FW_{signed\ A}$ based on the second secret key $sKEY_B$. The firmware FW, the A signature SIG A, and the first public key $pKEY_A$ may be data provisioned during the fabrication of the storage controller 210. The B signature SIG B and the second public key $pKEY_B$ may be received from the host 110 of FIG. 4. In the third state State 3, before executing the firmware FW, the storage controller 210 may verify the B signature SIG B based on the second public key $pKEY_B$ stored in the secure memory 217, and may verify the A signature SIG A based on the first public key $pKEY_A$. When the authentication state of the storage controller 210 is the fourth state State 4, the same data as the data in the third state State 3 may be stored in the ROM 216 and the secure memory 217.

Figure 10:
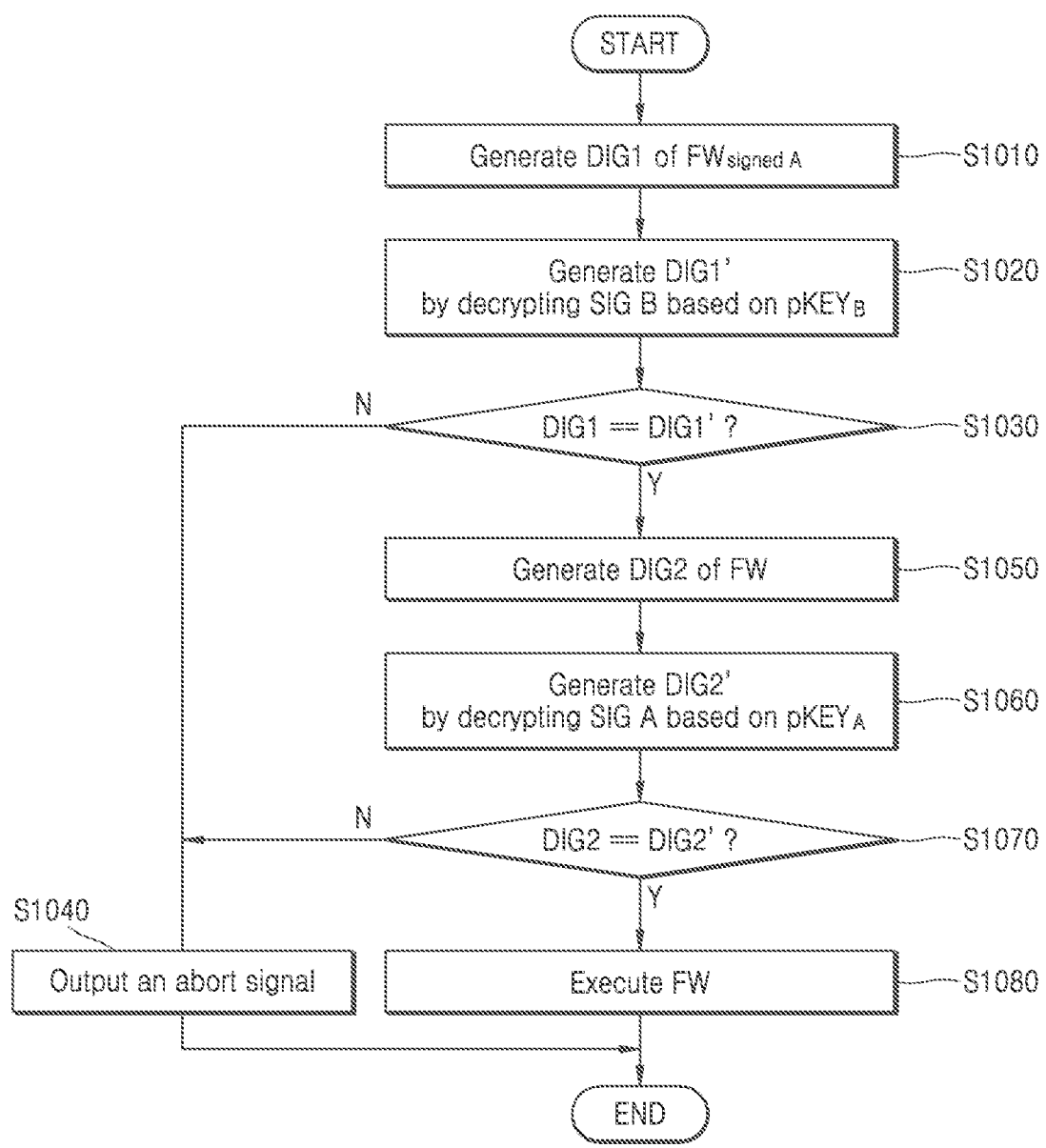
FIG. 10 is a flowchart illustrating a method of authenticating a software image, according to some example embodiments of the inventive concepts.

FIG. 10 is a flowchart illustrating a method of authenticating a software image, according to some example embodiments of the inventive concepts. The method of authenticating a software image may include a plurality of operations S1010 to S1090. Descriptions regarding FIG. 10 may be made below with reference to FIG. 2, 3, or 4.

In operation S1010, the storage controller 210 of FIG. 4 may generate a first digest DIG1 regarding the single-signed firmware $FW_{signed\ A}$. In some example embodiments, the encryption circuit 214 may generate the first digest DIG1 regarding the single-signed firmware $FW_{signed\ A}$ based on a hash algorithm. The hash algorithm may be the same as a hash algorithm used by a hash circuit (for example, the hash circuit 32 of FIG. 2), which is included in the image signing system 113 of FIG. 4, to generate the digest DIG. In some example embodiments, the hash circuit 41 included in the storage controller 21 of FIG. 3 may generate the first digest DIG1 regarding the single-signed firmware $FW_{signed\ A}$.

In operation S1020, the storage controller 210 may generate a first comparison target digest DIG1' by decrypting the B signature SIG B based on the second public key $pKEY_B$. In some example embodiments, the encryption circuit 214 may generate the first comparison target digest DIG1' by decrypting the B signature SIG B received from the host 110 based on the second public key $pKEY_B$ stored in the secure memory 217. In some example embodiments, the decryption circuit 42 included in the storage controller 21 of FIG. 3 may generate the first comparison target digest DIG1'.

In operation S1030, the storage controller 210 may compare the first digest DIG1 with the first comparison target digest DIG1'. In some example embodiments, the processor 213 may load the first digest DIG1 and the first comparison target digest DIG1' on the RAM 215 and may compare the first digest DIG1 with the first comparison target digest DIG1' based on a comparison instruction. In some example embodiments, the compare circuit 43 included in the storage controller 21 of FIG. 4 may compare the first digest DIG1 with the first comparison target digest DIG1'. When the first digest DIG1 is identical to the first comparison target digest DIG1', operation S1050 may be performed, and when the first digest DIG1 is not identical to the first comparison target digest DIG1', operation S1040 may be performed.

In operation S1040, the storage controller 210 may output an abort signal to the host 110. Specifically, in some example embodiments, the storage controller 210 may abort the execution of the firmware and output, to the host 110, the abort signal indicative of aborting the execution of the firmware. Alternatively, in some example embodiments, a booting abort signal from the storage controller 210 may be a signal indicative of aborting the progress of a booting procedure.

In operation S1050, the storage controller 210 of FIG. 4 may generate a second digest DIG2 regarding the firmware FW. In some example embodiments, the encryption circuit 214 may generate the second digest DIG2 regarding the firmware FW based on a hash algorithm. The hash algorithm may be the same as a hash algorithm used by a hash circuit (for example, the hash circuit 32 of FIG. 2), which is included in the image signing system 113 of FIG. 4, to generate a digest. In some example embodiments, the hash circuit 41 included in the storage controller 21 of FIG. 3 may generate the second digest DIG2 regarding the firmware FW.

In operation S1060, the storage controller 210 may generate a second comparison target digest DIG2' by decrypting the A signature SIG A based on the first public key $pKEY_A$. In some example embodiments, the encryption circuit 214 may generate the second comparison target digest DIG2' by decrypting the A signature SIG A received from the host 110 based on the first public key $pKEY_A$ stored in the secure memory 217. In some example embodiments, the decryption circuit 42 included in the storage controller 21 of FIG. 3 may generate the second comparison target digest DIG2'.

In operation S1070, the storage controller 210 may compare the second digest DIG2 with the second comparison target digest DIG2'. In some example embodiments, the processor 213 may load the second digest DIG2 and the second comparison target digest DIG2' on the RAM 215 and may compare the second digest DIG2 with the second comparison target digest DIG2' based on a comparison instruction. In some example embodiments, the compare circuit 43 included in the storage controller 21 of FIG. 4 may compare the second digest DIG2 with the second comparison target digest DIG2'. When the second digest DIG2 is identical to the second comparison target digest DIG2', operation S1070 may be performed, and when the second digest DIG2 is not identical to the second comparison target digest DIG2', operation S1040 may be performed. In operation S1070, when the second digest DIG2 is identical to the second comparison target digest DIG2', the firmware FW may be determined to be trustable.

In operation S1080, the storage controller 210 may execute the authenticated firmware FW. That is, the storage controller 210 may execute the authenticated firmware FW obtained by performing, during booting, the method of authenticating a software image, shown in FIG. 10. In some example embodiments, in operation S1080, the storage controller 210 may store the authenticated firmware FW, the A signature SIG A, and the B signature SIG B in the ROM 216 of FIG. 4. In some example embodiments, the storage controller 210 may perform authentication on new firmware FW or updated firmware FW based on operations S1010 to S1070 of the method of authenticating a software image, shown in FIG. 10, and may store the authenticated new firmware FW and a first signature (for example, SIG A) and a second signature (for example, SIG B) for the authenticated new firmware FW in the ROM 216 of FIG. 9. Firmware update may be described below with reference to FIG. 11.

Figure 11:
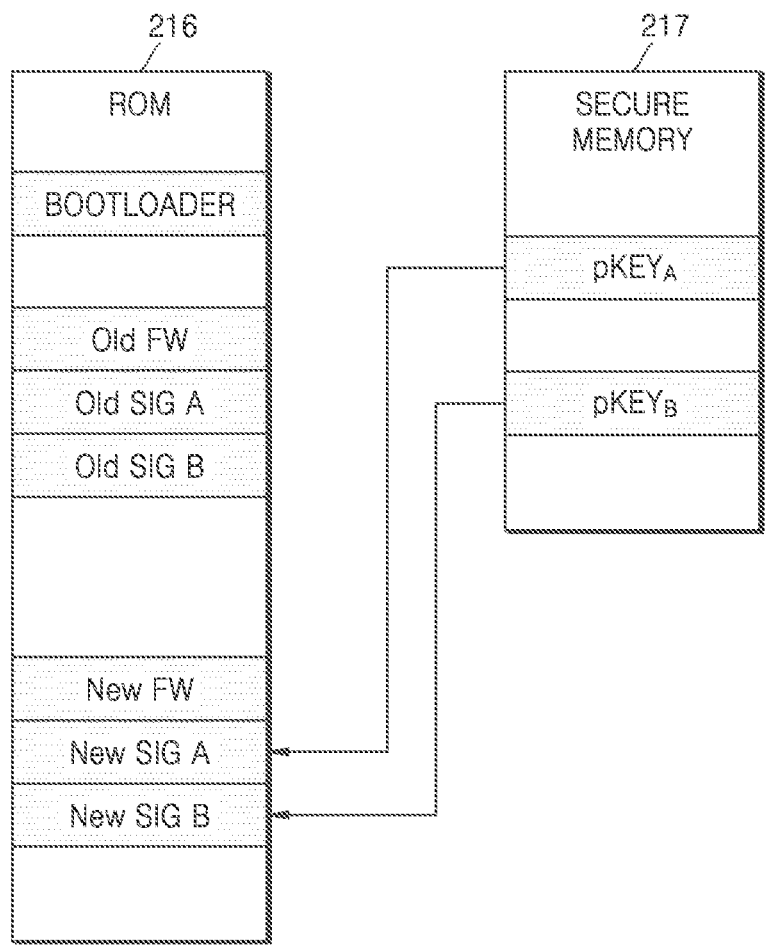
FIG. 11 is a diagram illustrating firmware update according to some example embodiments of the inventive concepts.

FIG. 11 is a diagram illustrating firmware update according to some example embodiments of the inventive concepts. Descriptions regarding FIG. 11 may be made below with reference to FIG. 4.

Specifically, the ROM 216 may store a bootloader including instructions, which are executed first of all by the processor 213, when power starts to be provided to the storage controller 210 or the storage controller 210 is reset. The bootloader may load firmware, which is stored in the ROM 216, on the RAM 215 by being executed by the processor 213.

The ROM 216 may store firmware and signatures for the firmware. For example, the ROM 216 may store firmware before being updated (that is, Old FW) and signatures (that is, Old SIG A and Old SIG B) for the corresponding firmware, that is, may store existing software images.

During the firmware update, the ROM 216 may store updated firmware (that is, New FW) and signatures (that is, New SIG A and New SIG B) for the corresponding firmware, that is, may store updated software images. Although the updated software images are shown as being stored in different storage regions from the existing software images, example embodiments of the inventive concepts are not limited thereto. That is, the existing software images may be erased, and the updated software images may be newly stored in erased storage regions.

Referring to FIG. 11, the storage controller 210 may verify, during booting, the signatures (that is, NEW SIG A and NEW SIG B) for the updated firmware (that is, New FW) based on the first public key pKEY$_A$ and the second public key pKEY$_B$ stored in the secure memory 217, and may execute the firmware (that is, New FW) based on verification results.

While the inventive concepts have been particularly shown and described with reference to example embodiments thereof, it will be understood that various changes in form and details may be made therein without departing from the spirit and scope of the following claims.

What is claimed is:

1. A storage system comprising:
   a host configured to
      receive a software image and a first signature for the software image, the first signature being generated based on a first secret key, and
      generate, based on a second secret key, a second signature for the software image; and
   a storage device configured to
      receive, from the host, the software image, the first signature, the second signature, and a second public key related to the second secret key,
      execute the software image based on a first verification and a second verification, the first verification being performed on the first signature on the basis of a first public key related to the first secret key, and the second verification being performed on the second signature on the basis of the second public key,
      receive, from the host, an updated software image, and a third signature and a fourth signature for the updated software image, and
      store the updated software image, the third signature, and the fourth signature, after verifying the third signature based on the first public key and verifying the fourth signature based on the second public key are completed.

2. The storage system of claim 1, further comprises:
   a processor;
   a non-volatile memory storing the software image, the first signature, and the second signature;
   a system memory configured to store the software image executed by the processor; and
   a secure memory storing the first public key and the second public key, and
   wherein the storage device is configured to load the software image on the system memory, after the first signature and the second signature are verified.

3. The storage system of claim 2, wherein
   the non-volatile memory stores a state table regarding authentication states, the authentication states indicating on which of the first public key and the second public key authentication of the software image is based, and
   the processor is configured to, based on the state table, change an authentication state to a state of authenticating the software image based on the first public key and the second public key.

4. The storage system of claim 2, wherein
   the storage device is further configured to receive a signature for the second public key from the host, the signature being generated based on the first secret key, and
   the secure memory stores the second public key, after authentication performed on the second public key is completed.

5. The storage system of claim 2, wherein
   the storage device is further configured to receive, from the host, a third public key related to a third secret key, a signature for the third public key, and a signature for the second public key, the signature for the third public key generated based on the first secret key, and the signature for the second public key generated based on the third secret key, and
   the secure memory stores the second public key and the third public key, after first authentication performed on the third public key and second authentication performed on the second public key are completed.

6. The storage system of claim 1, wherein the storage device is further configured to execute the updated software image during booting, after the third signature and the fourth signature are verified.

7. The storage system of claim 1, wherein the storage device is further configured to transfer a verification failure signal to the host, in response to failure of verification of the first signature or the second signature.

8. A storage controller comprising:
a non-volatile memory configured to store a software image, and a first signature for the software image, the first signature being generated based on a first secret key;
a secure memory storing a first public key used to verify the first signature;
a host interface configured to,
    receive, from a host, a second public key, and a second signature for the software image, and
    receive, from the host, an updated software image, and a third signature and a fourth signature for the updated software image; and
a processor configured to,
    selectively storing the software image by,
        authenticating the second public key,
        authenticating the second signature based on the second public key, and
        selectively storing the second signature in the non-volatile memory, the second public key in the secure memory, and the software image based on a result of authenticating the second public key and the second signature, and
    selectively storing the updated software image by,
        verifying the third signature based on the first public key,
        verifying the fourth signature based on the second public key, and
        selectively storing the updated software image, the third signature, and the fourth signature in the non-volatile memory based on a result of verifying the third signature and the fourth signature.

9. The storage controller of claim 8, wherein the processor is further configured to:
authenticate the software image during booting based on the first public key and the second public key; and
execute the software image based on an authentication result.

10. The storage controller of claim 8, wherein the non-volatile memory stores a state table regarding authentication states, the authentication states indicating signatures verified to authenticate the software image before the software image is executed, and
the processor is further configured to change, based on the state table, an authentication state to a state of the first signature and the second signature being verified after the first signature and the second signature are verified.

11. The storage controller of claim 8, wherein the processor is further configured to, during booting, execute the updated software image, after the third signature and the fourth signature are verified.

12. The storage controller of claim 8, wherein the host interface is further configured to transfer a verification failure signal to the host, in response to failure of verification of the first signature and the second signature.

13. A method of operating a storage device, which communicates with a host and stores a first public key, the method comprising:
receiving, by the storage device from the host, a software image, a first signature for the software image, a second signature for the software image, and a second public key;
performing, by the storage device, first verification on the first signature based on the first public key;
performing, by the storage device, second verification on the second signature based on the second public key;
storing, by the storage device, the software image, the first signature, and the second signature based on the first verification and the second verification;
receiving, by the storage device from the host, an updated software image, and a third signature and a fourth signature for the updated software image; and
storing, by the storage device, the updated software image, the third signature, and the fourth signature, after verifying the third signature based on the first public key and verifying the fourth signature based on the second public key are completed.

14. The method of claim 13, further comprising:
performing, by the storage device, the first verification and the second verification, during booting of the storage device; and
executing, by the storage device, the software image based on the first verification and the second verification.

15. The method of claim 13, further comprising:
receiving, by the storage device from the host, a third public key, a signature for the third public key, and a signature for the second public key;
performing, by the storage device, third verification on the signature for the third public key based on the first public key;
performing, by the storage device, fourth verification on the signature for the second public key based on the third public key; and
storing, by the storage device, the third public key and the second public key based on the third verification and the fourth verification.

16. The method of claim 13, further comprising:
outputting, by the storage device to the host, a signal indicating an abort of booting in response to failure of the first verification or the second verification.

17. The method of claim 13, wherein the performing of the first verification comprises:
generating, by the storage device, a first digest regarding the software image;
generating, by the storage device, a second digest by decrypting the first signature based on the first public key; and
generating, by the storage device, information indicating validity of the first signature based on a comparison result between the first digest and the second digest.

18. The method of claim 17, wherein the performing of the second verification comprises:
generating, by the storage device, a third digest regarding the software image and the first verification;
generating, by the storage device, a fourth digest by decrypting the second signature, based on the second public key; and
generating, by the storage device, information indicating validity of the second signature based on a comparison result between the third digest and the fourth digest.

* * * * *